United States Patent [19]
Reinke et al.

[11] Patent Number: 5,809,640
[45] Date of Patent: Sep. 22, 1998

[54] SPOOLING EQUIPMENT

[75] Inventors: Stephen M. Reinke; Joseph R. Luterek, both of Rochester, N.Y.

[73] Assignee: Eastman Kodak Company, Rochester, N.Y.

[21] Appl. No.: 813,259

[22] Filed: Mar. 7, 1997

[51] Int. Cl.[6] .................................................. B23P 19/00
[52] U.S. Cl. ............................... 29/806; 29/773; 269/218
[58] Field of Search .......................... 29/806, 773, 281.1; 269/218

[56] References Cited

U.S. PATENT DOCUMENTS

| | | |
|---|---|---|
| 5,044,144 | 9/1991 | Foote, Jr. et al. . |
| 5,105,535 | 4/1992 | Foote, Jr. et al. . |
| 5,117,688 | 6/1992 | Reinke et al. . |
| 5,119,549 | 6/1992 | Foote, Jr. et al. . |
| 5,125,254 | 6/1992 | Reinke et al. . |
| 5,125,630 | 6/1992 | Hoyt et al. . |
| 5,174,019 | 12/1992 | Lancy et al. . |

*Primary Examiner*—P. W. Echols
*Attorney, Agent, or Firm*—Clyde E. Bailey, Sr.

[57] ABSTRACT

Web spooling equipment has an improved means for closing a preform shell about a film spool or similar object. The improved equipment utilizes a rotatably mounted jaw assemblage having a pair of jaw members for opening to receive a preform shell enclosing a wound spool or similar object and then closing about the preform shell to form a near perfect round cylindrical shape. Precision movements of the jaw assemblage are governed by connecting links and a series of pivot members connecting the jaw members and connecting links. The closed preform shell is then transferred downstream of the closing step by the jaw assemblage for independent treatment.

11 Claims, 4 Drawing Sheets

SPOOLING EQUIPMENT

FIELD OF THE INVENTION

This invention relates generally to spooling equipment. More particularly, the invention concerns spooling equipment having an improved means for closing a preform shell about a wound film spool or similar object and then transferring the closed shell downstream for treatment by other independent means.

BACKGROUND OF THE INVENTION

In conventional film magazine assembly operations, multiple devices are typically used to close a metallic preform shell about a wound spool of film. Some such devices require the wound spool of film to be moved from the winding station to load the film into the preformed shell. And others require the shell to be formed and capped only on one end, then transferred over the wound spool of film.

A typical prior art method and apparatus for forming film cartridges is illustrated in U.S. Pat. No. 5,172,470 in which a pair of spring loaded arms are disclosed with rollers and "fitments" to form the cylindrical shell around a perfectly round mandrel. A cap is applied to one end of the shaped cylindrical shell with the mandrel inside the shell and the rollers and fitments holding the shell against the mandrel. This patent does not include forming and capping over a wound spool of film.

Further, U.S. Pat. No. 5,038,464 discloses a film magazine assembling system which uses a plurality of two-part magazine casing assembling chucks. This device requires the wound film spool to be loaded longitudinal into the shell carried by the chucks.

Moreover, U.S. Pat. No. 5,174,019 shows an apparatus and method for closing a non-circular cylindrical shell. Jaws having a limited stroke are used to engage the shell. However the jaws are not able to clear a wound spool of film when the arm assembly is pivoted past the wound spool in conventional spooling equipment. This equipment also requires the wound spool to be transferred to the location where the shell is closed.

While the prior art references above have had some degree of success in closing a preform shell enclosing an object, none of the references provide that the preform shell can be formed into an optimal non-circular cylindrical shape, then loaded over the wound spool at the winding station. Moreover, another shortcoming of the references is that jaw members are not provided that can be placed over the preform shell and closed thereby closing the shell into a near perfect cylinder without moving the wound spool, and then reliably and accurately transferring the closed shell for treatment by independent means.

Therefore, a need persists for an apparatus and method for shaping a preform shell about a wound film spool or similar object that employs jaw members having a predetermined configuration for closing the shell and pivotable members for enabling the assemblage to move into engagement with the wound spool partially enclosed in the preform shell.

SUMMARY OF THE INVENTION

It is an object of the present invention to provide improved spooling equipment having an improved mechanism for closing a preform shell about a wound film spool.

Still another object of the invention is to provide spooling equipment that can close a preform shell about a wound spool such that the closed assembly has a near perfect round cylindrical shape that conforms with the configuration of the closed jaw members.

Yet another object of the invention is to provide improved spooling equipment that can provide for closing a preform shell about a wound film spool and then transfer the closed assembly downstream for independent treatment.

It is a feature of the invention that a jaw assemblage has a pair of jaw members having movements precisely controlled by a series of pivot members and connecting links supporting the jaw members. Once closed, the shell containing the object is rotatably transferred by the jaw assemblage to a downstream station for independent treatment.

To accomplish these and other objects of the invention, there is provided spooling equipment having an improved apparatus for closing a preform shell about a wound film spool or similar object. In this embodiment of the invention, the spooling equipment having the improved apparatus comprises a jaw assemblage having a pair jaw members for receiving and then closing the preformed shell about the object. Precision movements of the jaw members are controlled by a pair of connecting links and a series of pivot members pivotably connecting the jaw members, connecting links and a drive means. The preformed shell is initially at least partially open so that once the object is introduced therein, the preform shell can be closed about it by the jaw members. Means is provided for alternately moving the preformed shell into and from the jaw members when the jaw members are open. Further, drive means is provided for alternately opening and closing the jaw members about the partially opened preformed shell to form a closed shell/object assembly having a nearly perfect round cylindrical shape conforming with the configuration of the closed jaw members.

Accordingly, an important advantageous effect of the present apparatus and method for closing a preform shell about a wound film spool or similar object uses a pair of jaw members with a predetermined configuration for receiving and closing the preformed shell into a near perfect cylindrical configuration conforming with the predetermined configuration of the jaw members. It is another advantage of the invention that the closed assembly can be transferred to a downstream station for independent treatment. Yet another advantage of the present invention is that the apparatus can rotatably move into position to receive and then close the partially closed preform shell about the object without interfering with the pre-positioned wound film spool.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 1:
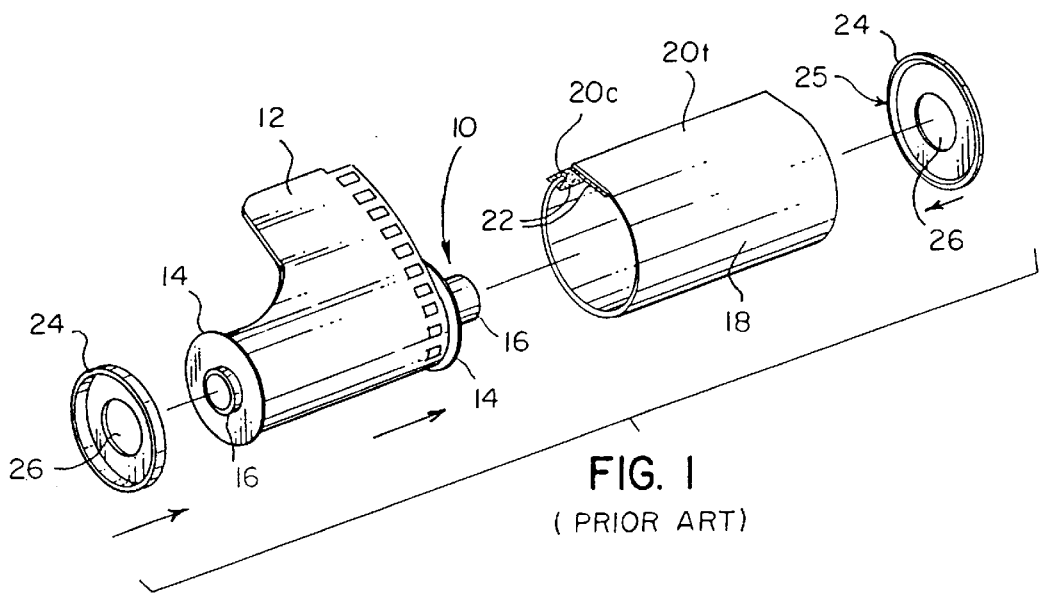
FIG. 1 shows an exploded perspective view of a known type of magazine for photographic film, illustrating one prior art technique for inserting a prewound spool axially into the shell of the magazine and applying end caps.

The following is a detailed description of the preferred embodiments of the invention, reference being made to the drawings in which the same reference numerals identify the same elements of structure in each of several Figures.

FIG. 1 illustrates a known process for loading photographic film magazines. A spool 10 has been used which comprises a central core, not illustrated, on which is wound a strip 12 of photographic film. Spool 10 includes a pair of end flanges 14 from which extend hollow axial hubs 16. A preformed metal shell 18 has been used which comprises a pair of axially extending lips 20c, 20t between which strip 12 is withdrawn from or wound back into the magazine in use by the consumer. These axially extending lips 20c, 20t typically are different in geometry, lip 20c being folded or crimped back on itself and lip 20t being essentially tangent to the cylindrical preformed shell 18. Typically, preformed shell 18 has been formed from a substantially flat rectangular blank, not illustrated, in which lips 20c, 20t have previously been formed. To prevent leakage of light into the magazine, lips 20c and 20t have for many years been covered with a lightlock material 22 such as black velvet or plush which firmly but gently engages the surfaces of the film and prevents light leakage into the magazine. The ends of the magazine are closed by a pair of annular end caps 24, each having an aperture 26 for rotatably receiving hubs 16 and a circumferentially extending groove and flange for fixedly engaging the end edges of preformed shell 18. Such magazines have been assembled by inserting the prewound spool of film axially into preformed shell 18 and then applying and staking end caps 24. While this spooling and assembling process is reliable and has been rather widely used, the apparatus for practicing the process tends to be limited in speed.

Figure 2:
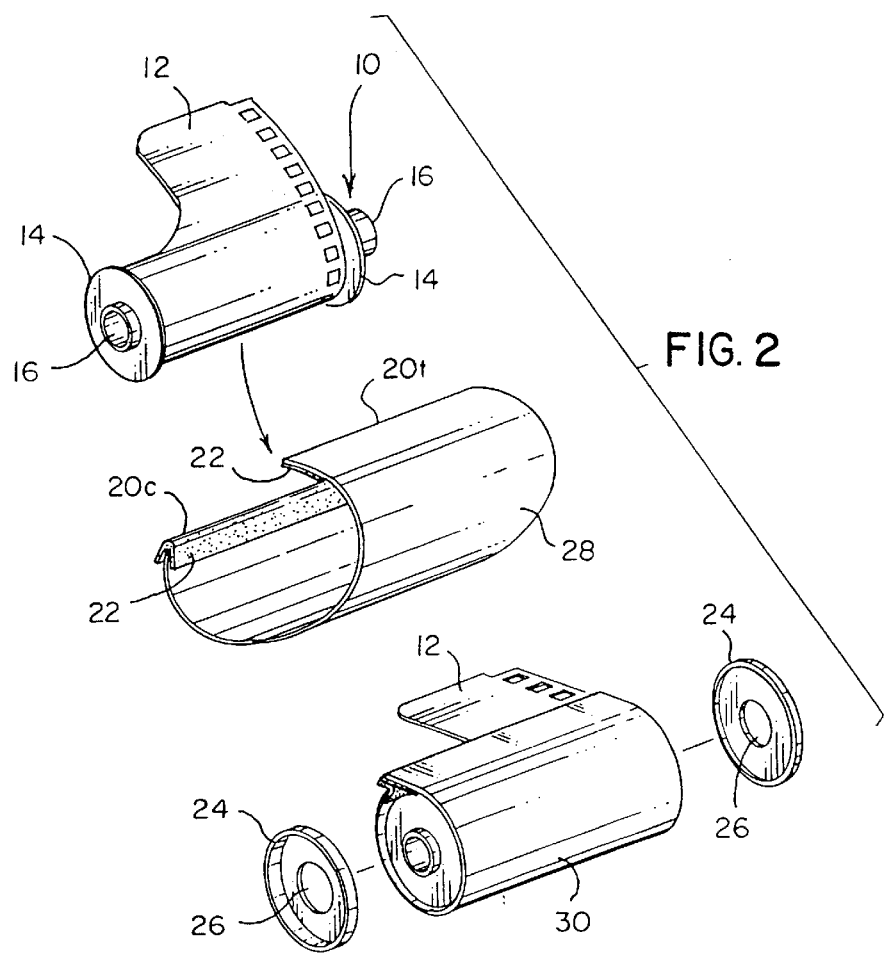
FIG. 2 shows an exploded perspective view of a known type of magazine for photographic film, illustrating a method for inserting a prewound spool axially into the shell of the magazine and applying end caps.

FIG. 2 illustrates how a magazine can be assembled using, in part, the method and apparatus of the present invention. In this instance, instead of the essentially cylindrical preformed shell 18 used in the past to permit axial insertion of the prewound spool, a very open preformed metal shell 28 is provided. Very open shell 28 is configured such that axially extending lips 20c, 20t are spaced far enough apart to permit the prewound spool to be inserted laterally or radially into shell 28 using the apparatus of the invention. Then, very open shell 28 is closed about the prewound spool by the apparatus of the invention (described in details below) to a substantially cylindrical configuration with the lead end of strip 12 captured between lips 20c, 20t. Then end caps 24 are applied and staked to complete the magazine.

Shell Closing Apparatus 100

Figure 3:
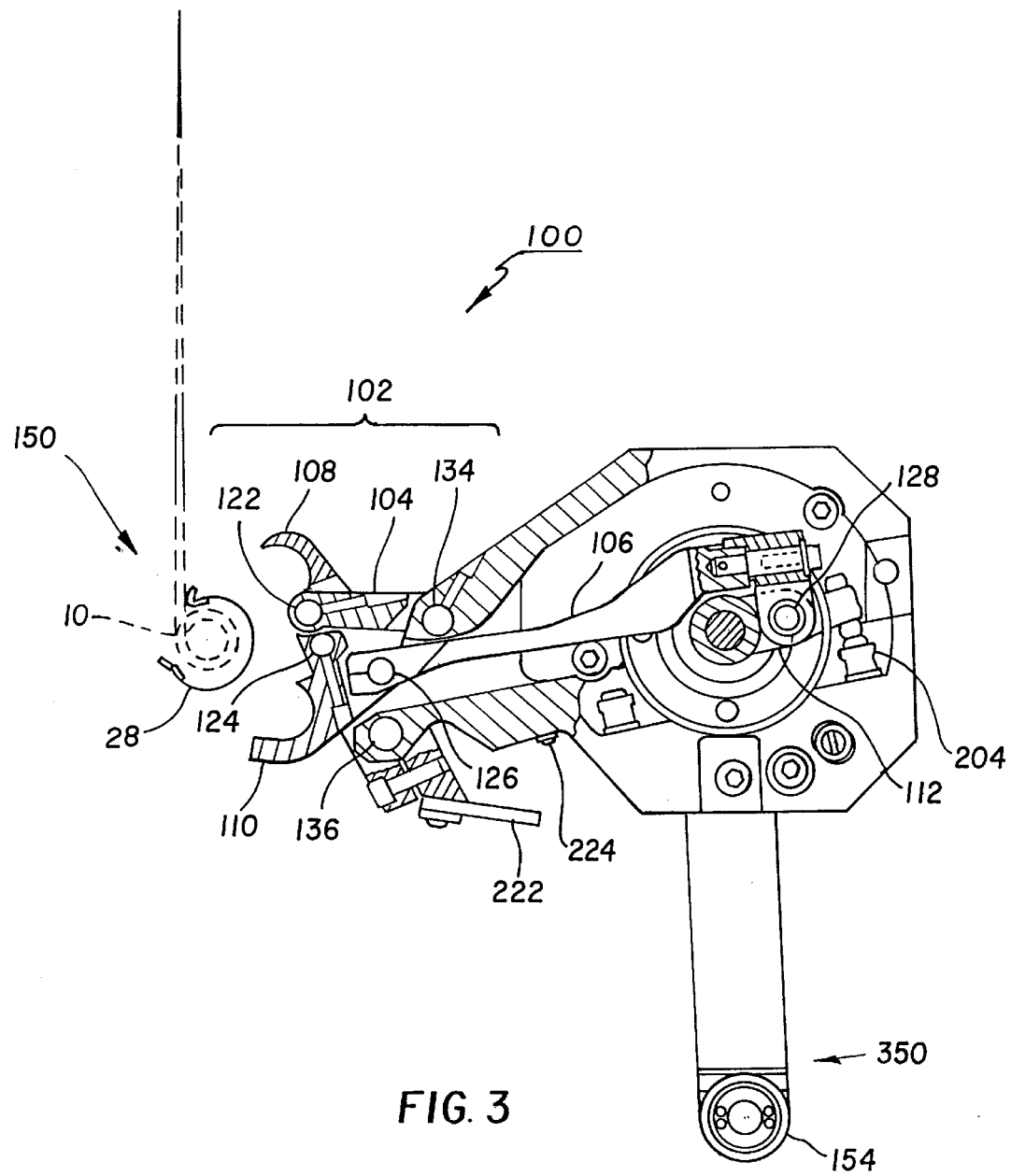
FIG. 3 shows a partially sectioned front elevation view of the apparatus of the invention illustrating the jaw assemblage having jaw members in a fully open position.
Figure 4:
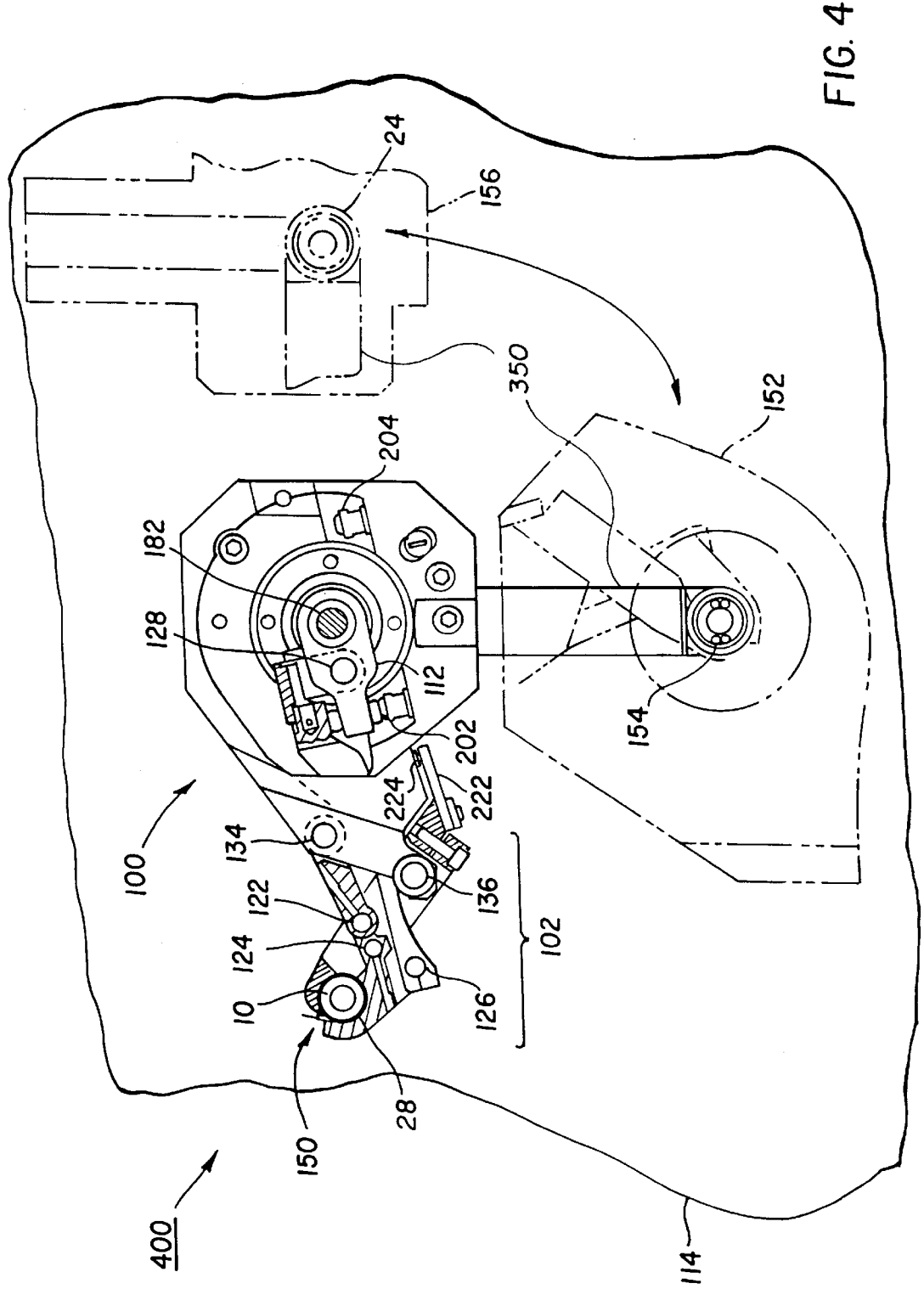
FIG. 4 shows a fragmentary, partially sectioned front elevation view of spooling equipment having the apparatus in FIG. 3 in the closed position; and, FIG. 5 shows a partially sectioned right side elevation view of the apparatus of the invention.
Figure 5:
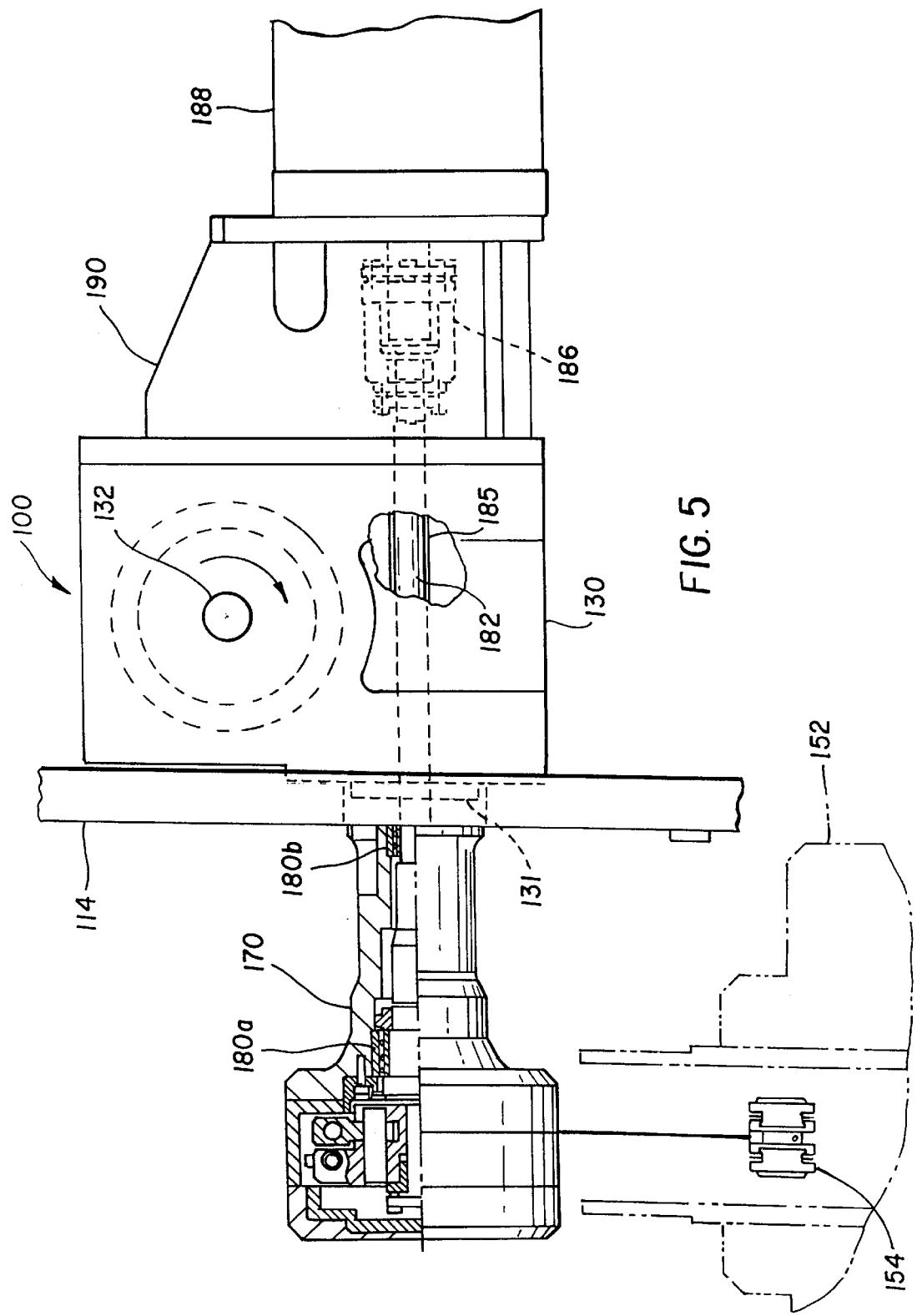

The apparatus 100 according to the principles of the invention is illustrated in FIGS. 3–5. According to FIG. 3, apparatus 100 for closing a preform shell 28 about an object or wound film spool 10 has a jaw assemblage 102 mounted for rotation about frame 114. Jaw assemblage 102 comprises first pivotable connecting link 104 and a second pivotable connecting link 106. Connecting links 104, 106 are made preferably from a rigid material, such as metal or plastic. Connecting links 104, 106 are configured so as to prevent interference of links and other components of the apparatus during movement. Second connecting link 106 moves generally rotationally and translationally while the first connecting link 104 moves generally rotationally. Further, jaw assemblage 102 has first and second jaw members 108, 110 pivotably connected by a first pivot member 124. When open, the jaw members 108, 110 can receive the preform shell 28 partially enclosing the object or wound film spool 10 therein. When the first and second jaw members 108, 110 are closed about the preform shell 28 containing the object or wound film spool 10, the partially open preform shell 28 is closed and forms a substantially rounded cylindrical shape that conforms with the closed jaw members 108, 110. Apparatus 100 includes a first drive means 112 (described more fully below), cooperatively connected to the second connecting links 106, for producing simultaneous movement of the first and second connecting links 104, 106, as described above, thereby causing the first and second jaw members 108, 110 to open and close.

Referring again to FIG. 3, first drive means 112 for opening and closing first and second jaw members 108, 110, mentioned heretofore, comprises a first pivot member 124 which connects first and second jaw members 108, 110. A second pivot member 122 connects the first jaw member 108 to the first connecting link 104 for moving the pair of jaw members 108, 110 between an open and closed position. Third pivot member 126 pivotably connects the second jaw member 110 to the second connecting link 106 for controlling the movement of the first and second jaw members 108, 110. Also second connecting link 106 is pivotably connected to first drive means 112 by fourth pivot member 128. Moreover, first connecting link 104 is pivotably connected to first drive means 112, for opening and closing the first and second jaw members 108, 110 about the first pivot member 124. A fifth pivot member 134 connects the first connecting link 104 to the bearing housing 170, described below. First jaw member 108 is also connected to the bearing housing 170 by sixth pivot member 136. Pivot members may be any rigid material such as metal or plastic.

As illustrated in FIGS. 4 and 5, second drive means 130, preferably a commercially available oscillating drive like the one made by the Camco Company, located in Wheeling, Ill., is rigidly mounted to frame member 114 for rotating jaw assemblage 102 in the manner described above. According to FIG. 5, jaw assemblage 102 is rotatably mounted to the output flange 131 of second drive means or oscillating drive, 130. Input shaft 132 of the oscillating drive 130 rotates at a constant speed which, in turn, rotates an internal cam (not shown) causing jaw assemblage 102 to oscillate about the center of output flange 131 between the spool winding station 150 and the capping station 152 (FIG. 4). In a preferred embodiment of the equipment 400, jaw assemblage 102 oscillates 90 degrees between the winding and capping stations 150, 152, respectively. This oscillation of jaw assemblage 102, therefore, enables it to rotate back and forth between, for instance, spool winding station 150 and capping stations 152 in typical spooling equipment. Moreover, the oscillation of jaw assemblage 102 also rotates the endcap holder 154 back and forth between the cap feed station 156 and capping station 152.

As best illustrated in FIG. 5, jaw assemblage 102 is rigidly attached to a bearing housing 170 which is affixed to output flange 131. Bearing housing 170 encloses bearings 180a, 180b, although a single bearing can be used. Bearings 180a, 180b rotatably supports output shaft 182 which clears throughhole 185 along a central axis of the output flange 131 of oscillating drive 130. Affixed to output shaft 182 is a coupling 186 which connects to a rotary actuator 188. Rotary actuator 188 is fixed to the back of the oscillating drive 130 via a mounting bracket 190. In the preferred embodiment, rotary actuator 188 is powered pneumatically and drives output shaft 182 which provides the means of opening and closing the jaw members 108, 110.

Referring again to FIG. 4, in operation, when the actuator 188, described above, rotates the first drive means 112 in a counterclockwise direction against first stop member 202, the jaw members 108, 110 closes to a near perfectly round cylindrical shape about the preform shell 18 and wound film spool 10. When the actuator 188 is rotated in a clockwise direction against the second stop member 204, the jaw members 108, 110 are opened completely, as shown in FIG. 3. In practice, the rotary actuator 188 can rotate a full 270 degrees, thus allowing for the 90 degree rotation of the jaw assemblage 102 as well as 180 degrees to open and close the jaw members 108, 110.

Referring again to FIG. 4, when the jaw members 108, 110 are closed, third and fourth pivot members 126, 128 are aligned with output shaft 182. Also, when jaw members 108, 110 are closed, pivot members 124, 122, 126, 134 are aligned with each other. We have found that this combination of links and their pivot members provide numerous advantages in our invention. First, a large mechanical advantage is achieved to compress the plush lips 20c, 20t of the open form into the desired closed form diameter. Moreover, the jaw members 108, 110 can be opened very wide, allowing the jaw assemblage 102 to swing up clearing the wound spool 10 of film at the wind station. Also, clearance is provided at the capping station to remove the finished product. The second jaw member 110 engages the crimped lip 20c of the open preform shell 28 before the first jaw member 108, thus positioning the preform shell 28 reliably during closing. Also, the second jaw member 110 rotates during closing with the preform shell 28 to minimize the relative motion between the jaw assemblage 102 and shell 28. As indicated, jaw members 108, 110 are configured to close the open preform shell 28 around the largest wound spool 10 of film without collapsing onto the spool 10.

Illustrated in FIG. 3–4, a leaf spring 222 is attached to the back of first jaw member 108. Thus, when the first jaw member 110 is in the closed position, spring 222 bends against a third stop member 224, thus providing a force to absorb the clearances between all the connecting linkages 104, 106 and their respective pivot members.

Overall Operation

Once again referring to FIG. 4, the fragmentary layout of a film spooling and packaging equipment 400 embodying the apparatus 100 according to the invention is illustrated. A rigid, vertically standing frame member 114 is preferred to provide a mount for the components of the invention; however, frame member 114 may be oriented differently or replaced with a structural framework without departing from the scope of the invention. A film winding station 150 is arranged on frame member 114 for supporting wound spool 10. An apparatus similar to the one described in U.S. Pat. No. 5,125,630, hereby incorporated herein by reference, can be used to introduce the spool 10 into the spool winding station 150. A preform shell 18 is loaded over wound spool 10 by a loading mechanism (not shown) prior to being closed by a closing apparatus 100, described in details below. A capping station 152 for inserting end caps 24 of the closed shell 18 is arranged about frame member 114 downstream of the spool winding station 150 and shell closing operation. End caps 24 are fed into capping station 152 via a transfer arm assembly 350, partially illustrated in FIG. 4. Transfer arm assembly 350 rotates in synchronism with the jaw assemblage (see directional arrows), described below, so that as the end caps are loaded into capping station 152, the jaw assemblage is positioned at the spool winding station 150.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

Parts List

10 . . . spool
12 . . . strip
14 . . . end flanges
16 . . . axial/hollow hubs
18 . . . shell
20c, 20t . . . lips
22 . . . lightlock material/strips
24 . . . end caps
26 . . . apertures
28 . . . open shell
100 . . . shell closing apparatus
102 . . . jaw assemblage
104 . . . first connecting link
106 . . . second connecting link
108 . . . first jaw member
110 . . . second jaw member
114 . . . frame member
122 . . . second pivot member
124 . . . first pivot member
126 . . . third pivot member
128 . . . fourth pivot member
130 . . . drive means/oscillating drive
131 . . . output flange
132 . . . input shaft
134 . . . fifth pivot member
136 . . . sixth pivot member
150 . . . spool winding station
152 . . . capping stations
154 . . . endcap holder
156 . . . cap feed station
170 . . . bearing house
180a . . . bearing
180b . . . bearing
182 . . . output shaft
185 . . . throughhole
186 . . . coupling
188 . . . rotary actuator
190 . . . mounting bracket
202 . . . first stop member
204 . . . second stop member
222 . . . leaf spring
224 . . . third stop member
350 . . . transfer arm assembly
400 . . . equipment

What is claimed is:

1. Improved spooling equipment of the type having a frame for mounting a winding means for winding film onto a spool, means for placing a preform shell over a wound film spool, means for closing the preform shell about the wound spool forming a shell assembly, wherein the means for closing comprises the improvement of:

a jaw assemblage mounted for rotation about said frame, said jaw assemblage comprising: first and second connecting links; first and second jaw members pivotably connected to said first and second connecting links, respectively; first-, second-, and third pivot members, wherein said first pivot member pivotably connects said first and second jaw members, said second pivot member pivotably connects said first jaw member to said first connecting link, and wherein said third pivot member pivotably connects said second jaw member to said second connecting link; and, first drive means is operably connected to said second connecting link for producing simultaneous movement of said first and second connecting links thereby causing said first and second jaw members to open and close.

2. The equipment recited in claim 1, further comprising means for moving the jaw assemblage into position to receive and then close the preform shell about the wound film spool.

3. The equipment recited in claim 1, wherein said preform shell when closed by said jaw members has a substantially round cylindrical shape.

4. The equipment recited in claim 1, wherein said preform shell comprises a somewhat rigid metallic material.

5. The equipment recited in claim 1, further comprising a second drive means rigidly mounted to said frame for oscillating said jaw assemblage between a first and second position, said second drive means comprising an oscillating cam drive mechanism.

6. The equipment recited in claim 5, wherein a rotary actuator is cooperatively associated with said oscillating dire mechanism for opening and closing said jaw members.

7. The equipment recited in claim 5, wherein said jaw assemblage is rigidly attached to a bearing housing mounted on said oscillating drive, said bearing housing comprising at least a single bearing for enabling said jaw assemblage to rotate about an output shaft extending from said first drive means.

8. The equipment recited in claim 1, wherein a fourth pivot member pivotably connects the second connecting link to said first drive means.

9. The equipment recited in claim 8, wherein a fifth pivot member pivotably connects the first connecting link to said bearing housing and a sixth pivot member connects the first jaw member to said bearing housing.

10. The equipment recited in claim 9, wherein said first-, second-, third- and fifth pivot members are aligned with one another when said jaw members are closed.

11. The equipment recited in claim 1, further comprising means for inserting end caps on opposite ends of the closed preform shell.

\* \* \* \* \*